Feb. 3. 1925.
J. T. SANDBERG,
ANTIFRICTION BALL OR ROLLER BEARING
Filed April 4, 1921
1,524,999
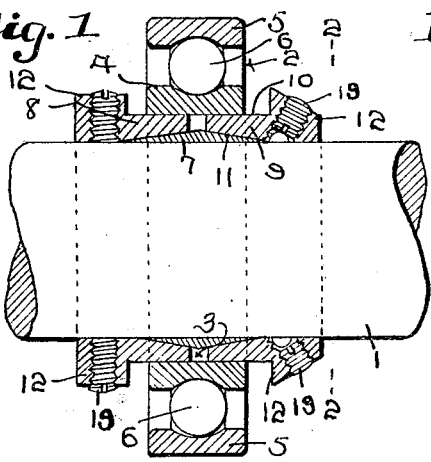
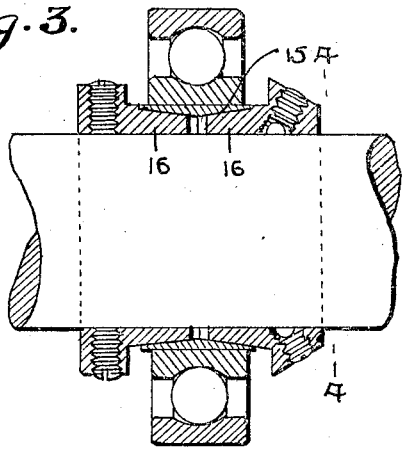
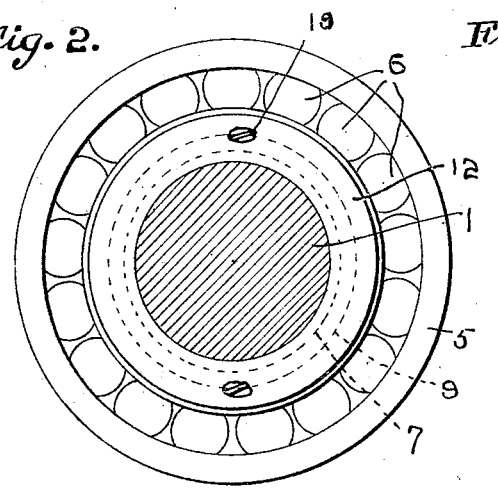
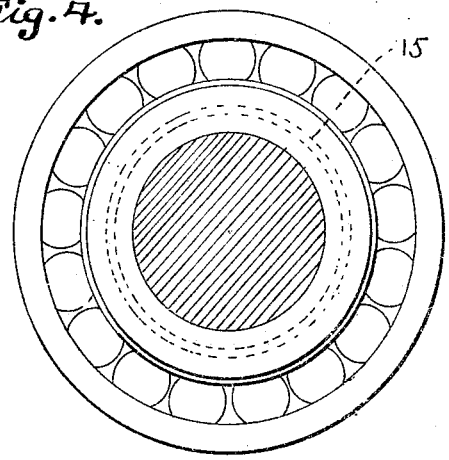
INVENTOR.
J. T. Sandberg
BY Marks & Clerk
ATTORNEYS Patented Feb. 3, 1925.

1,524,999

UNITED STATES PATENT OFFICE.

JAMES TORSTEN SANDBERG, OF GOTTENBORG, SWEDEN.

ANTIFRICTION BALL OR ROLLER BEARING.

Application filed April 4, 1921. Serial No. 458,463.

*To all whom it may concern:*

Be it known that I, JAMES TORSTEN SANDBERG, a subject of the King of Sweden, residing at Gottenborg, in the county of Gottenborg and Bohus and Kingdom of Sweden, have invented new and useful Improved Antifriction Ball or Roller Bearings (for which I have filed applications in Sweden, May 24, 1919, No. 2426/1919, and England, January 10, 1921, No. 1647/1921), of which the following is a specification.

The present invention relates generally to antifriction ball or roller bearings and more particularly has reference to an improved method of mounting such bearings on a shaft or similar seating.

The invention as its primary object is designed for use in connection with ball or roller bearings provided with cylindrical inner surfaces on the inner race rings and comprises means for rigidly securing the inner race ring in various positions longitudinally of a supporting shaft without necessitating the altering of the shape or size of the inner race ring or shaft.

More particularly the present invention includes the provision of three different sleeves mounted for coaction between the bearing and the seating, these sleeves having cylindrical surfaces bearing against the inner race ring of the bearing and the seating and conical surfaces bearing against and coacting with each other.

The invention is clearly illustrated in the accompanying drawings in which:

Figure 1 is a vertical longitudinal sectional view of one embodiment of the invention associated with the shaft, the latter being shown in elevation.

Fig. 2 is a transverse sectional view on the line 2—2 of Fig. 1.

Fig. 3 is a view similar to Fig. 1 of a modified arrangement of the invention, and Fig. 4 is a transverse sectional view taken on the line 4—4 of Fig. 3.

Similar characters of reference are employed in all the above described views, to indicate corresponding parts.

Referring now, more particularly to the accompanying drawings, there is provided a shaft 1 on which is mounted a ball or roller bearing generally designated by the numeral 2 through the instrumentality of the improved mounting means generally designated by the numeral 3. The bearing which may be of the ball or roller type, in this instance of the ball type, includes inner and outer race rings 4 and 5 between which are operably mounted ball bearings 6 the inner surface of the inner ring 4 being smooth and cylindrical and of a diameter greater than the external diameter of the shaft.

The improved mounting means includes a sleeve 7 which may be of a split or sectional type, the inner surface being smooth and cylindrical and of a diameter substantially conforming to the external diameter of the shaft, said sleeve being adapted for disposition about the shaft, while the outer portion is shaped to provide reversely inclined conical surfaces. Co-acting with the sleeve 7 are two additional sleeves 8 and 9, in the present instance being provided with smooth outer cylindrical surfaces 10 and inner conical surfaces 11, these sleeves being adapted for insertion in the spaces between the ring 7 and the inner race ring 4 of the bearing. It will be observed that upon inserting these sleeves upon opposite sides of the bearing and into the spaces between the bearing and the shaft and the sleeve 7 that the conical surfaces 11 will ride on the correspondingly shaped conical surfaces of the ring 7 while the outer cylindrical surfaces 10 will frictionally bind against the cylindrical inner surfaces of the inner race ring, the mounting of the sleeves 8 and 9 in such manner serving to tightly clamp or bind the split ring 7 about the shaft and at the same time maintain the bearing 3 in substantially rigid position relative to the shaft. The outer portions of the sleeves 8 and 9 are formed with external annular flanges 12 in which are adjustably mounted a series of suitable fasteners such as clamping screws 19 which are designed to be forced into biting engagement with the shaft subsequent to the mounting of the sleeves 7, 8 and 9 in the manner described.

In the slightly modified form shown in Figures 3 and 4 a ring 15 corresponding to the ring 7 in the preferred form is provided with a smooth outer cylindrical surface for co-acting with the cylindrical inner surface of the inner race ring of the bearing, while the inner surface of such ring 15 is shaped with oppositely inclined or conical faces for co-acting with the outer conical faces of the anchoring rings 16 corresponding to the rings 8 and 9 of the preferred form. These rings 16 in turn are formed with small inner cylindrical surfaces which co-act with the outer cylindrical surface of the shaft. It is apparent that the application with this form of mounting or fastening means is substantially the same as the preferred form as the remaining parts are constructed in substantially exact accordance with the corresponding parts of the preferred form.

The preferred manner of securing the bearing 3 on the shaft 1 is as follows:

Assuming that the parts have been assembled as described and shown in Figures 1 and 2 it is at first desirable to mount the sleeve 7 on the shaft, then applying the sleeve 8 longitudinally of the shaft and laterally of the sleeve 7. While the latter sleeve is being arranged in co-acting relation to the sleeve 7 the bearing 4 is moved in an opposite direction along the shaft and engaged about the outer surface of the sleeve 8. Subsequent to the fixing of these parts the sleeve 7 is brought toward such parts in the same direction as the bearing and such sleeves are forced to the fullest extent into the spaces between the sleeve 7 and bearing 3 whereby the sleeves due to their conical surfaces bear against each other and force the sleeve 7 into clamping relation with the shaft and bind the inner race ring of the bearing against movement. When adjusted in this manner the clamping screws 19 are forced into biting engagement with the shaft to positively prevent accidental movement.

It is believed in view of the foregoing that a further detail description of the operation of the invention is entirely unnecessary. Likewise it is believed that the advantages of the invention will be readily apparent.

Having thus fully described the invention what is claimed as new and desired to be secured by Letters-Patent is:

A mounting for antifriction or roller bearings including in combination a shaft, a bearing the inner race ring of which is provided with a smooth inner surface, an inner metallic and resilient sleeve the inner surface of which is smooth and cylindrical and in diameter substantially conforming to the diameter of the shaft so as to be disposed about the shaft while the outer portion is provided with reversely inclined conical surfaces, a pair of additional sleeves of wedge-like form having inner conical surfaces for coacting with the adjacent conical surfaces of the resilient sleeve while the outer surfaces are smooth and cylindrical for coacting with the inner cylindrical surface of the inner race ring when the conical surfaces are brought into engagement with each other so as to press the resilient sleeve into binding engagement with the shaft so as to maintain the bearing against accidental longitudinal movement on the shaft.

In testimony whereof I have affixed my signature.

JAMES TORSTEN SANDBERG